United States Patent
Gianos et al.

(10) Patent No.: US 9,436,763 B1
(45) Date of Patent: Sep. 6, 2016

(54) INFRASTRUCTURE ENABLING INTELLIGENT EXECUTION AND CRAWLING OF A WEB APPLICATION

(75) Inventors: Nicholas Philip Gianos, San Francisco, CA (US); Paul Christopher Jeffries, Menlo Park, CA (US); Pedram Keyani, San Carlos, CA (US); Chetan Gowda, Mountain View, CA (US); Siddharth Kar, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 214 days.

(21) Appl. No.: 12/755,275

(22) Filed: Apr. 6, 2010

(51) Int. Cl.
*G06F 7/00* (2006.01)
*G06F 17/30* (2006.01)
(52) U.S. Cl.
CPC ..... *G06F 17/30864* (2013.01); *G06F 17/3089* (2013.01)
(58) Field of Classification Search
USPC .......................................................... 707/709
See application file for complete search history.

(56) References Cited

U.S. PATENT DOCUMENTS

| | | | |
|---|---|---|---|
| 7,500,188 B1 * | 3/2009 | Trapani et al. | 715/273 |
| 7,975,220 B2 * | 7/2011 | Hattori | 715/249 |
| 2003/0149871 A1 * | 8/2003 | Medvinsky | 713/155 |
| 2006/0161989 A1 * | 7/2006 | Reshef et al. | 726/26 |
| 2006/0230011 A1 * | 10/2006 | Tuttle et al. | 706/62 |
| 2006/0259492 A1 * | 11/2006 | Jun et al. | 707/9 |
| 2007/0061877 A1 * | 3/2007 | Sima et al. | 726/12 |
| 2007/0162479 A1 * | 7/2007 | Begun et al. | 707/101 |
| 2007/0198510 A1 * | 8/2007 | Ebanks | 707/5 |
| 2007/0298720 A1 * | 12/2007 | Wolman et al. | 455/66.1 |
| 2008/0016233 A1 * | 1/2008 | Schneider | 709/230 |
| 2008/0178162 A1 * | 7/2008 | Sanford et al. | 717/139 |
| 2008/0235383 A1 * | 9/2008 | Schneider | 709/229 |
| 2009/0215469 A1 * | 8/2009 | Fisher et al. | 455/456.3 |
| 2010/0042931 A1 * | 2/2010 | Dixon et al. | 715/738 |

* cited by examiner

*Primary Examiner* — Alexey Shmatov
*Assistant Examiner* — Muluemebet Gurmu
(74) *Attorney, Agent, or Firm* — Baker Botts L.L.P.

(57) ABSTRACT

In one embodiment, a method includes accessing a structured document of a network application, processing the structured document to generate a model representation of the structured document, tracking one or more interactions occurring during the processing of the structured document, the one or more interactions including one or more outgoing requests transmitted by the one or more computing systems or incoming responses received by the one or more computing systems, and generating a behavior model of the web application based on one or more of the interactions.

21 Claims, 3 Drawing Sheets

INFRASTRUCTURE ENABLING INTELLIGENT EXECUTION AND CRAWLING OF A WEB APPLICATION

TECHNICAL FIELD

The present disclosure relates generally to Web applications, and more particularly, to generating behavior models of Web applications.

BACKGROUND

Conventionally, when a request for a web page or other structured document transmitted by a client device is received by a server or computing system hosting the web page, the hosting system typically generates a base web page in the form of a Hyper Text Markup Language (HTML), Extensible Markup Language (XML), or other web browser-supported structured document. The generated structured document is then transmitted in a response to the requesting client via a Hypertext Transfer Protocol (HTTP) or other suitable connection for rendering at the client device. The structured document may include one or more executable scripts, resources (e.g. a JavaScript script or resource, a Cascading Style Sheet (CSS) resource, an image, a video, etc.), or references to such resources, embedded within the transmitted document. By way of example, a resource embedded in an HTML document may generally be included or specified within a script element, image element, or object element, among others, depending on the type of resource. The element referencing or specifying the resource may include a source attribute (e.g., src) identifying a location of the resource to the client requesting the web page. Typically, upon receipt of the response, the web browser or other client application running at the client device executes various scripts, constructs a document object model (DOM) representation of the received structured document and requests the resource(s) (which may be at one or more other external locations) embedded in the document.

DESCRIPTION OF EXAMPLE EMBODIMENTS

Particular embodiments relate to an infrastructure or platform (hereinafter infrastructure and platform may be used interchangeably) that enables intelligent execution and crawling of a dynamic network or web application (hereinafter network application and web application may be used interchangeably). Various portions of such a platform may be implemented via a hardware architecture or software framework that enables various software components or processes to implement particular embodiments. The platform may include one or more hardware or software components, one or more of which may be located or embodied in one or more consolidated or distributed computing systems. In particular embodiments, portions of the platform may embody a headless browser application capable of crawling and actually executing JavaScript or other executable code segments used to serve, implement, or render a dynamic web application. In particular embodiments, outgoing requests, incoming responses, or other events occurring as a result of executing a dynamic web application are tracked and logged. In particular embodiments, uniform resource locators (URLs) associated with outgoing requests or incoming responses, including but not limited to requests transmitted to an advertisement ("ad") network or ad server or ads received from an ad network or ad server, may be logged in a database. In some implementations, the platform, after a web page has finished loading a structured document, can execute rule-based scripts that scan attributes of the loaded document and enumerate various attributes of the page that match the rule set and store them for further analysis. In some implementations, the platform allows for the configuration of scripts that cause the platform to navigate and take actions with respect to a series of pages, such as logging in to a site with a set of credentials and then navigating to a particular web page. Particular embodiments further relate to a headless browser capable of generating a model representation of a web application, scripting or querying against the model representation, and generating a behavioral model of the web application.

In various example embodiments, one or more described web pages or web applications may be associated with a social networking system or social networking service. However, alternate embodiments may have application to the retrieval and rendering of structured documents or web applications hosted by any type of network addressable resource or web site. As used herein, a "user" may be an individual, a group, or an entity (such as a business or third party application). Additionally, as used herein, "or" may imply "and" as well as "or;" that is, "or" does not necessarily preclude "and," unless explicitly stated or implicitly implied.

Figure 1:
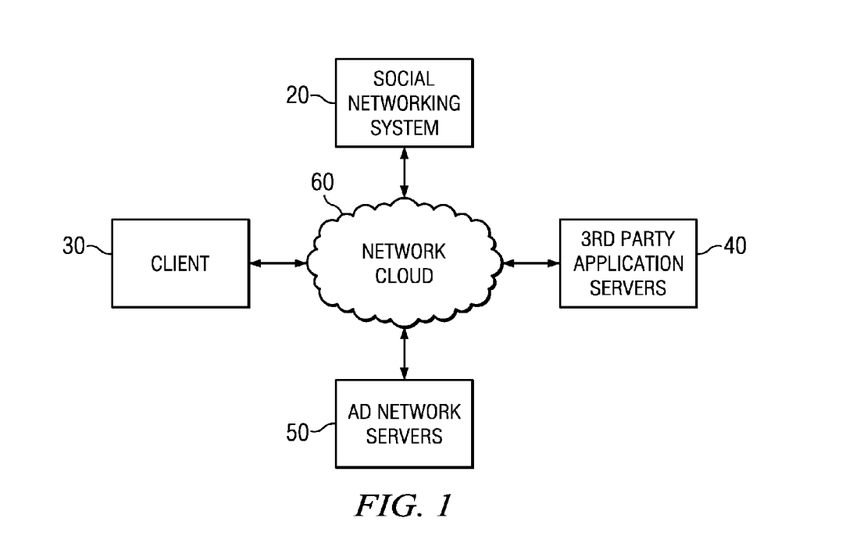
FIG. 1 illustrates an example network environment of an example networking system.

Particular embodiments may operate in, or in conjunction with, a wide area network environment, such as the Internet, including multiple network addressable systems. FIG. 1 illustrates an example network environment, in which various example embodiments may operate. Network cloud 60 generally represents one or more interconnected networks, over which various systems and hosts described herein may communicate. Network cloud 60 may include packet-based wide area networks (such as the Internet), private networks, wireless networks, satellite networks, cellular networks, paging networks, and the like. As FIG. 1 illustrates, particular embodiments may operate in conjunction with a network environment comprising social networking system 20, one or more third party web application servers 40, one or more ad network servers 50, or one or more client devices 30. Client devices 30, web application servers 40, and ad network servers 50 may be operably connected to the network environment and network cloud 60 via a network service provider, a wireless carrier, a set of routers or networking switches, or any other suitable means.

Each client device 30 may generally be a computer or computing device including functionality for communicating (e.g., remotely) over a computer network. Client device 30 may be a desktop computer, laptop computer, personal digital assistant (PDA), in- or out-of-car navigation system, smart phone or other cellular or mobile phone, or mobile gaming device, among other suitable computing devices. Client device 30 may execute one or more client applications, such as a web browser (e.g., MICROSOFT WINDOWS INTERNET EXPLORER, MOZILLA FIREFOX, APPLE SAFARI, GOOGLE CHROME, AND OPERA, etc.), to access and view content over a computer network. In particular implementations, the client applications allow a user of client device 30 to enter addresses of specific network resources to be retrieved, such as resources hosted by social networking system 20. These addresses can be Uniform Resource Locators (URLs). In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

Figure 2:
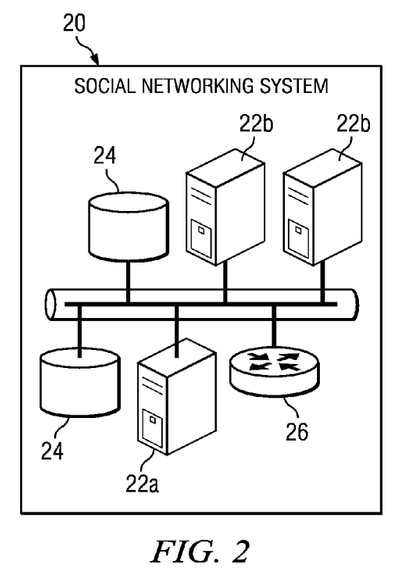
FIG. 2 illustrates an example networking system.

In one example embodiment, social networking system 20 comprises computing systems that allow users at client devices 30 to communicate or otherwise interact with each other and access content, such as user profiles, as described herein. Social networking system 20 is a network addressable system that, in various example embodiments, comprises one or more physical servers 22a or 22b (hereinafter referred to collectively as servers 22) as well as data store 24, as illustrated in FIG. 2. The one or more physical servers 22 are operably connected to computer network 60 via, by way of example, a set of routers or networking switches 26. In an example embodiment, the functionality hosted by the one or more physical servers 22 may include web or HTTP servers, FTP servers, as well as, without limitation, web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), and the like.

Physical servers 22 may host functionality directed to the operations of social networking system 20. By way of example, social networking system 20 may host a website that allows one or more users, at one or more client devices 30, to view and post information (including internal or external hypertext links), as well as communicate with one another via the website. Hereinafter servers 22 may be referred to as server 22, although server 22 may include numerous servers hosting, for example, social networking system 20, as well as other content distribution servers, data stores, and databases. Data store 24 may store content and data relating to, and enabling, operation of the social networking system as digital data objects. A data object, in particular implementations, is an item of digital information typically stored or embodied in a data file, database or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 24 corresponds to one or more of a variety of separate and integrated databases, such as relational databases and object-oriented databases, that maintain information as an integrated collection of logically related records or files stored on one or more physical systems. Structurally, data store 24 may generally include one or more of a large class of data storage and management systems. In particular embodiments, data store 24 may be implemented by any suitable physical system(s) including components, such as one or more database servers, mass storage media, media library systems, storage area networks, data storage clouds, and the like. In one example embodiment, data store 24 includes one or more servers, databases (e.g., MySQL), and/or data warehouses.

Data store 24 may include data associated with different social networking system 20 users or client devices 30. In particular embodiments, the social networking system 20 maintains a user profile for each user of the system 20. User profiles include data that describe the users of a social network, which may include, for example, proper names (first, middle and last of a person, a trade name and/or company name of a business entity, etc.) biographic, demographic, and other types of descriptive information, such as work experience, educational history, hobbies or preferences, geographic location, and additional descriptive data. By way of example, user profiles may include a user's birthday, relationship status, city of residence, and the like. The system 20 may further store data describing one or more relationships between different users. The relationship information may indicate users who have similar or common work experience, group memberships, hobbies, or educational history. A user profile may also include privacy settings governing access to the user's information is to other users. In particular embodiments, the social networking system 20 maintains in data store 24 a number of objects for the different kinds of items with which a user may interact while accessing social networking system 20. In one example embodiment, these objects include user profiles, application objects, and message objects (such as for wall posts, emails and other messages). In one embodiment, an object is stored by the system 20 for each instance of its associated item. These objects and the actions discussed herein are provided for illustration purposes only, and it can be appreciated that an unlimited number of variations and features can be provided on a social networking system 20.

When a user at a client device 30 desires to view a particular web page (hereinafter also referred to as target structured document) hosted by social networking system 20 or a web application hosted by a web application server 40 and made available in conjunction with social networking system 20, the user's web browser, or other document rendering engine or suitable client application, formulates and transmits a request to social networking system 20. The request generally includes a URL, or other document identifier, as well as metadata or other information. By way of example, the request may include information identifying the user, such as a user ID, as well as information identifying or characterizing the web browser or operating system running on the user's client computing device 30. The request may also include location information identifying a geographic location of the user's client device or a logical network location of the user's client device. The request may also include a timestamp identifying when the request was transmitted.

A web page, or resource embedded within a web page, which may itself include multiple embedded resources, may include data records, such as plain textual information, or more complex digitally encoded multimedia content, such as software programs or other code objects, graphics, images, audio signals, videos, and so forth. One prevalent markup language for creating web pages is the Hypertext Markup Language (HTML). Other common web browser-supported languages and technologies include the Extensible Markup Language (XML), the Extensible Hypertext Markup Language (XHTML), JavaScript, Cascading Style Sheet (CSS), and, frequently, Java. By way of example, HTML enables a page developer to create a structured document by denoting structural semantics for text and links, as well as images, web applications and other objects that can be embedded within the page.

By way of background, HTML enables developers to embed objects or resources, including web applications, widgets, images, or videos, within a structured document such as a web page. Generally, an HTML structured document is written in the form of HTML elements that consist of tags (surrounded by angle brackets) within the structured document content, which act as indicators to a web browser rendering the structured document as to how the document is to be interpreted by the web browser and ultimately presented on a user's display. By way of example, HTML elements may represent headings, paragraphs, hypertext links, embedded media, and a variety of other structures. HTML can include or can load scripts in languages such as JavaScript, which affect the behavior of HTML processors such as conventional web browsers, and Cascading Style Sheets (CSS), which define the appearance and layout of text and other content.

Generally, a web application is an application that may be accessed via a web browser or other client application over a network, or a computer software application that is coded in a web browser-supported language and sometimes reliant on a web browser to render the application executable. Web applications have gained popularity largely as a result of the ubiquity of web browsers, the convenience of using a web browser launched at a remote computing device as a client (sometimes referred to as a thin client), and the corresponding ability to update and maintain web applications without necessarily distributing and installing software on remote clients. Often, to implement a web application, the web application requires access to one or more resources provided at a backend server of an associated website. Additionally, web applications may often require access to additional resources associated with other applications.

A Web page may be delivered to a client as a static structured document, however, through the use of Web elements embedded in the page (e.g., executable JavaScript code segments), an interactive experience may be achieved with the page or a sequence of pages. During a user session at the client device, the Web browser interprets and displays the pages and associated resources received or retrieved from the Web application or Website hosting the Web page, as well as, potentially, resources from other Websites. By way of example, upon receipt of an HTML structured document by a Web browser, the Web browser may execute embedded calls including JavaScript code segments, which then call or request resources from third party hosts or Websites. Such embedded and executed JavaScript code may also modify the Document Object Model (DOM) representation of the page and perform redirects (described below). For example, a first request for a given web page may actually initiate a process where a browser receives a series of pages, each of which redirect the browser to another web page (within or outside of the domain of the previous web page), before the browser settles on a final landing page. As described below, in particular embodiments, such modifications (e.g., through JavaScript) and redirects may be monitored and tracked.

Typically, a web browser used to access a webpage (or structured document) for rendering at a client device 30, obtains the required resources (e.g., in response to executing JavaScripts or other calls embedded in a requested and received structured document and which may include HTML or XML code, JavaScript scripts, or content including text, audio, and video) for rendering the webpage from one or more servers and then constructs a browser representation of the webpage. One prevalent browser representation is the DOM representation of the webpage. The web browser then renders the page in the particular client viewing window of the browser utilizing the DOM (or other suitable) representation. The DOM may be considered an application programming interface (API) for, by way of example, valid HTML and well-formed XML documents, but the DOM, in and of itself, is foremost a representational model for structured data. Languages or code segments like JavaScript may be used to access the DOM in the context of a client application such as a browser. A DOM representation of a structured document defines the logical structure of the document as well as the way the document is accessed and manipulated. The structure of a DOM representation is generally based on an object structure that closely resembles the logical structure of the document (e.g., webpage) it models. The DOM representation is generally hierarchical in nature. More particularly, by way of example, a DOM representation typically has a logical structure that resembles a tree or group of trees each having branches that link DOM nodes of a plurality of DOM levels. In such a manner, a given DOM node at one DOM level of the DOM hierarchy may have (hereinafter also "include," "comprise," or "be associated with") one or more "child" nodes each logically arranged in a lower child DOM level, that, in turn, each have one or more of their own child nodes logically arranged in a still lower grandchild DOM level, and so on. As those of skill in the art will appreciate, as one proceeds logically through the hierarchy to lower DOM levels, the corresponding DOM nodes in those lower levels become more detailed in their representation of ever-smaller logical portions of the corresponding structured document. In this way, all the text and other content specified in the underlying HTML and/or other code is translated by the browser into DOM nodes or elements of finer and finer granularity. By way of example, at a first level, the entire document (page) may be represented by a DOM root node. Progressing down the tree, the document may include a picture, video, interactive window, block of text, and/or other content including scripts and various calls to APIs represented in finer and finer detail by subsequent level nodes.

Social networking system 20 may include a multitude of features with which users at remote clients 30 may interact during user sessions. In particular embodiments, these features may be implemented as web applications and may utilize JavaScript and CSS resources requested from servers 22, third party web application servers 40 as well as other external servers or data stores, including ad network servers 50. The web applications or resources may be embedded in various underlying or base web pages served to remote clients, such as in frames or iFrames, sections, or "divs" and the like, as described in more detail below. The web applications offered in conjunction with social networking system 20 may include internal web applications hosted by social networking system 20 as well as external third party web applications (e.g., games) hosted by web application servers 40, through which other ad network servers may be accessed. By way of example, the social networking system hosted by Facebook®, Inc. of Palo Alto, Calif., includes or supports such internal web applications as the "wall," a space on every user's profile page that allows friends to post messages for the user to see; "pokes," which allows users to send a virtual "poke" to each other (a notification that tells a user that they have been poked); "photos," where users can upload albums and photos; "status," which allows users to inform their friends of their whereabouts and actions; "streams," which may appear in multiple locations on the site, including on every user's homepage, which include information about the activities of the user's connections; "notes," a blogging feature that allows tags and embeddable images as well as blogs imported from other blogging websites and services; as well as a large number of third party applications for which the website serves as a platform.

As FIG. 1 illustrates, social networking system 20, client devices 30, web application servers 40, and ad networks 50 may communicate with one another via computer network 60. In particular embodiments, social networking system 20 provides a platform by which third party application developers can create applications that are hosted on respective web application servers 40. In particular embodiments, web application developers creating web applications for use by users of social networking system 20 may create such applications using the Facebook Markup Language (FBML) developed by Facebook®, Inc. of Palo Alto, Calif. Third party application developers may construct applications that hook into one or more of several social networking system integration points, including user profiles, profile actions, canvas pages (described below), News Feeds, and Mini-Feeds. FBML is an evolved subset of HTML with some elements removed and others which have been added that may be specific to Facebook.

When a third party application developer creates a web application for use by users of social networking system 20, the developers may decide whether to configure the web application using, for example, IFrames or FBML, as the default for the application's canvas (base) pages. A canvas page is the address where the web application is located or cached within social networking system 20. When user's access a given web application via social networking system 20, the users are taken to the canvas page which serves as a base page that effectively hosts the web application and in which the web application is rendered and displayed.

Figure 3:
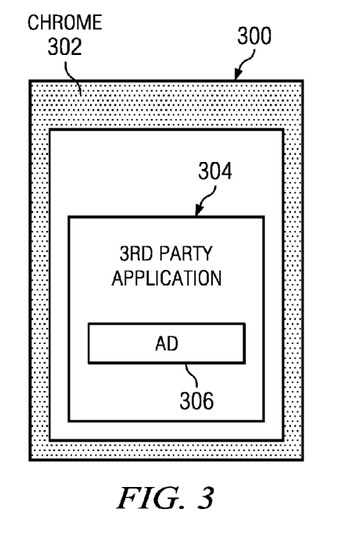
FIG. 3 illustrates an example web page.

By way of example, referring to an IFrame canvas page such as that illustrated in FIG. 3, when a user loads the application's canvas page, social networking system 20 generates a web page 300 (in the form of a structured document) that contains the social networking system web interface chrome 302 surrounding the web application's IFrame 304; that is, the web application content is rendered inside IFrame 304. Generally, the IFrame 304 has a URL to the respective web application's callback URL. Social networking system 20 may also append a number of parameters to the callback URL. These parameters may provide information about which user is logged into the application and verify that the request is indeed coming through social networking system 20, among other information.

As additionally illustrated in FIG. 3, the web application rendered in IFrame 304 may also include an embedded call to an ad network server 50. Generally, web application developers monetize their web applications by selling advertising space within their IFrame windows. By way of example, Web application IFrame 304 may include an embedded IFrame 306 used to render an ad. To increase the relevancy of such ads or maximize profit, the ad rendered in IFrame 306 may be targeted to the specific user, the specific web application, or targeted based on some other criteria. The ability to target ads to specific users or groups of users or to specific content generally increases the relevancy and effectiveness of the advertising. An advertisement (ad) as used herein may be considered content (e.g., text, graphical, video, etc.) that is embedded within or rendered in conjunction with a base page, which may include one or more web applications. In the following described embodiments, ads may be received from ad networks 50 in response to ad requests embedded within web applications hosted by web application servers 40 and rendered in conjunction with base pages hosted by social networking system 20 and transmitted to a client device 30 as a structured document. An ad network may generally be a vendor or platform that serves ads from an ad inventory in response to ad requests from a content provider such as a web application developer or social networking system 20. In some embodiments, ad requests may include one or more parameters related to social networking system 20, the user of the social networking system (e.g., the user's sex, age, demographic, etc.), or the web application making the ad request to specify the intended target of the ad so that the ad network server 40 can return a more relevant, rich, or targeted ad to the user. In alternate embodiments, ad requests may not include any information about the user or social networking system 20 that would identify the user to intentionally prevent such identifying information from being transmitted to ad networks 50.

Figure 4:
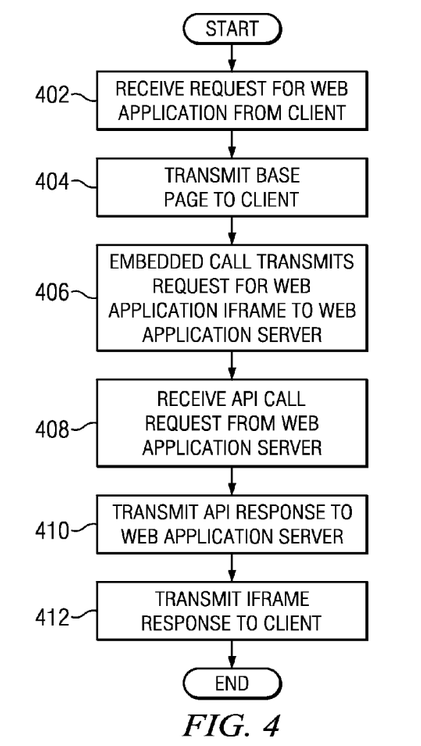
FIG. 4 shows a flowchart illustrating an example method for serving a web application canvas page.

Referring to FIG. 4, an example process for serving an IFrame-based web application canvas page will now be described. First, an initial request is transmitted from the user's client device 30 or other client application (as will be described later, particular embodiments relate to a client emulator that emulates a test (fake) user and headless browser application) to social networking system 20, which receives the request at 402. By way of example, the request may generally include the web application's canvas page URL (the location of the web application canvas page in social networking system 20), which may resemble something like http://apps.facebook.com/application_name/canvas_page. Social networking system 20 then transmits a response at 404 to the user's client device 30 that includes a base page in the form of a structured document including social networking system chrome content (such as borders and side menus. The structured document also includes an embedded code segment that then makes and transmits a request at 406 for the web application IFrame to the web application's associated web application server 40. The web application server 40 may then make an API call request that is transmitted at 408 to social networking system 20. Social networking system 20 then transmits an API response to web application server 40 at 410. Web application server 40 then transmits the IFrame response that includes the web application to the user's client device 30 at 412 for rendering by a browser or other client application in IFrame 304 in conjunction with the rendering of the remaining portions of web page 300. As the web application in IFrame 304 is executed and rendered, the web application may make a call to one or more ad network servers 50 requesting one or more ads for rendering in ad IFrame 306.

Figure 5:
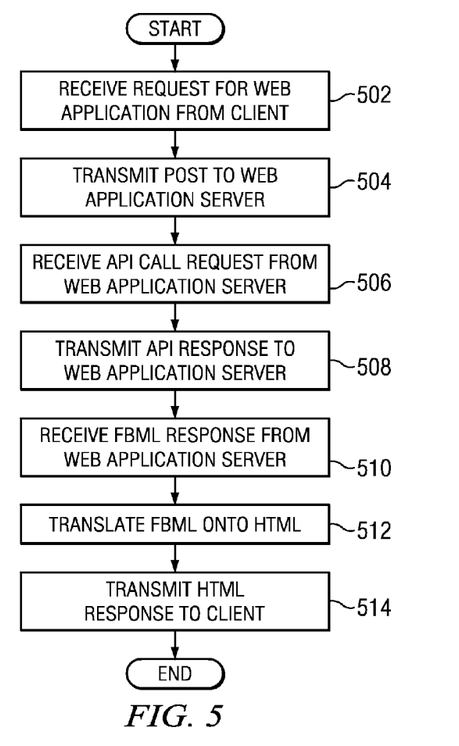
FIG. 5 shows a flowchart illustrating another example method for serving a web application canvas page.

Referring now to FIG. 5, an example process for serving an FBML-based application canvas page will now be described. First, an initial request is transmitted from the user's client device 30 or other client (again, as will be described later, particular embodiments relate to a client emulator that emulates a test (fake) user and headless browser application) to social networking system 20, which receives the request at 502. Again, the request includes the web application's canvas page URL, which may resemble something like http://apps.facebook.com/application_name/canvas_page. However, rather then sending a response immediately, social networking system 20 may transmit an HTTP POST at 504 to a callback URL on the web application's respective web application server 40 where the application is hosted (e.g., http://www.applicationserver.com/callbackurl/canvaspage). In this manner, parameters are sent as part of the POST request rather than as part of the URL. More particularly, after the initial request is received by social networking system 20, social networking system 20 then transmits a request for FBML at 504 to web application server 40. In some cases, web application server 40 then transmits an API call at 506 to social networking system 20, which then responds to web application server 40 with an API response at 508. Web application server 40 then formulates and transmits an FBML response with the web application content and resources to social networking system 20, which receives the FBML response at 510. Social networking system 20 then translates the FBML into HTML at 512 and subsequently transmits an HTML response at 514 including the base canvas page and web application content and resources to the requesting client for rendering the web application and surrounding canvas. As the web application is executed and rendered, the web application may make a call to one or more ad network servers 50 requesting one or more ads for rendering in conjunction with the web application.

As described above, particular embodiments relate to an infrastructure or platform that enables intelligent execution and crawling of a dynamic network or web application. Particular embodiments further relate to a headless browser capable of generating a model representation of a web application, scripting against the model representation, and generating a behavioral model of the web application. In particular embodiments, portions of the platform may embody a novel headless browser application capable of crawling and actually executing JavaScript or other executable code segments used to implement and render a web application. In particular embodiments, outgoing requests, incoming responses, or other events occurring as a result of serving and executing a web application are tracked and logged. In particular embodiments, uniform resource locators (URLs) associated with outgoing requests or incoming responses, including but not limited to requests transmitted to and from social networking system 20, web application servers 40, or ad network servers 50, may be logged in a database. By way of example, given that third party web application developers are using third party ad networks to serve ads in order to monetize the developer's web application, it may be desirable to have knowledge of which ad networks 40 are serving which ads and for which web applications.

However, browser security mandates that parent documents, such as web application canvas page 300, do not have the ability to look inside the underlying code of an IFrame from another domain, such as a web application IFrame 304 or ad IFrame 306. However, this does not hold true for a web browser, which needs details of such code to render the IFrames or other web page portions. Additionally, conventional web crawlers do not have the ability to actually execute JavaScript and other embedded executable code segments. Hence, conventional web crawlers cannot reach deep within a web application. Furthermore, conventional web crawlers cannot navigate through most redirects. By way of example, a conventional web crawler may be able to parse and recognize HTML Meta Refresh redirects but are unable to parse, recognize, and navigate through JavaScript redirects and Flash redirects. URL redirection, also known as URL forwarding, and the similar technique of domain redirection, also known as domain forwarding, are techniques used generally for making a given web page available under many URLs. While there are several legitimate reasons for implementing URL redirection, URL redirection is sometimes used as a part of phishing attacks. Phishing is generally considered a criminally fraudulent process of attempting to acquire sensitive or personal information, such as usernames, passwords, or credit card details, by masquerading as a trustworthy entity. By way of example, JavaScript offers several ways to display a different page in the current browser window. Another example is a frame redirect, which can be achieved by creating a single HTML frame that contains the target page. For a frame redirect, the browser displays the URL of the frame document and not the URL of the target page in the URL bar. Such a technique may be used with fraudulent intentions to conceal a phishing site as part of website spoofing. Additionally, it should be noted that one redirect may then lead to another redirect. As a conventional web crawler does not actual execute embedded executable code segments such as JavaScript, convention web crawlers are not able to navigate redirects and discover fraudulent or scrupulous web pages.

Figure 6:
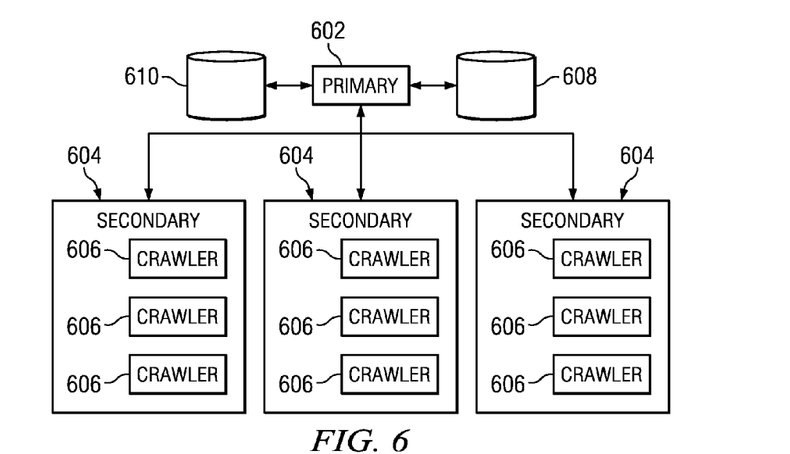
FIG. 6 illustrated an example system for crawling and generating behavior models of web applications.

Thus, in particular embodiments, social networking system 20 includes or is coupled to an infrastructure or platform that enables intelligent crawling and actual execution of web pages and web applications, and which may log information that may be used to discover web application providers and ad network servers 50 that may not deliver ads according to service agreements in line with social networking system 20, or which otherwise perform scrupulously. In particular embodiments, social networking system 20 includes or is coupled to a primary-secondary distributed computing system that includes primary computing system (primary) 602 and one or more secondary computing systems (secondary) 604. Each secondary 604 is capable of running one or more crawler processes 606. In particular embodiments, each crawler process 606 may effectively behave as, or similar to, a headless browser (e.g., a browser capable of navigating and rendering web applications and pages without requiring a physical monitor or display in connection with the browser), and which uses test user credentials generated or stored in user credential database 610 to crawl web applications scheduled by master 602.

More particularly, web application database 608 stores a list or queue of web applications to be crawled by crawler processes 606. In particular embodiments, primary 602 serves as a scheduler that instructs crawler processes 606 to crawl web applications listed in database 608. In particular embodiments, each crawler process 606 is similar to a headless browser in that a monitor or other display or visual interface is not required. In particular embodiments, each crawler process 606 is implemented with the C++ code language or, or as well as, some or all of the Cross Platform Component Object Model (XPCOM). XPCOM is a cross platform component model from MOZILLA enabling programmers to plug their custom functionality into the framework and connect it with other components. XPCOM is a development environment that provides features such as component management, file abstraction, object message passing, and memory management for cross-platform software developers. In particular embodiments, each crawler process 606 is further implemented with some or all of the GECKO layout engine (the layout engine of the MOZILLA FIREFOX web browser) overtop of XPCOM. XPCOM makes the functionality of GECKO available as a series of components, or reusable cross-platform libraries, than can be accessed or scripted from each crawler application 606. In addition, given the browser functionality and libraries available to the crawler application 606, such as a Javascript engine, various rule-based scripts can be created to scan the DOM and enumerate desired attributes of a web page, such as identifying a form and enumerating its fields and buttons, identifying a background image and hashing the image file to derive a value that can be compared to other images, and the like.

Still further, each crawler process 606 effectively emulates a browser client at a client device 30, and as such, has browser-privileged access to all the content accessible by a browser. Furthermore, each crawler process 606 may have access to computer network cloud 60 either directly or through social networking system 20. Also, in this way, each crawler process 606 may be completely unplugged from the user-side in that, in particular embodiments, the crawler processes 606 do not interact with real users of social networking system 20.

Figure 7:
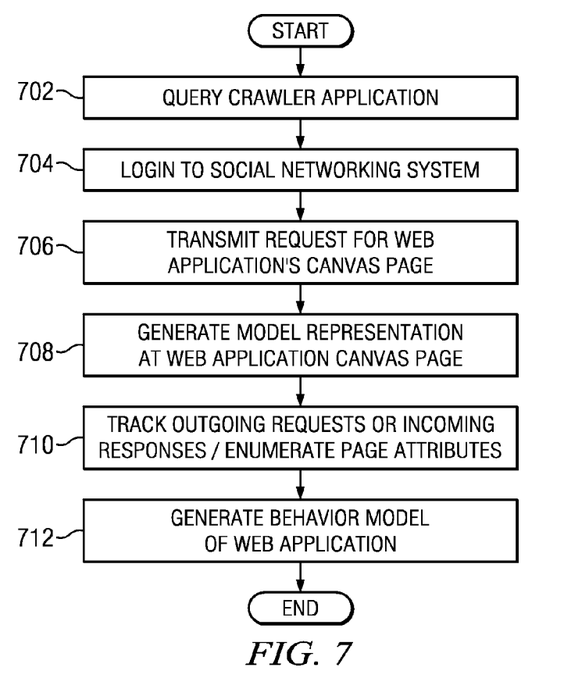
FIG. 7 shows a flowchart illustrating a method for crawling and generating a behavior model of a web application.

Referring now to FIG. 7, a method for intelligently crawling and executing a web application and logging requests and responses during such crawling and executing will now be described. In particular embodiments, the method begins at 702 with primary 602 querying, at 702, a specific crawler process 606 running within a specific secondary 604. The query identifies a particular web application from web application database 608 that primary 602 instructs the crawler process 606 to crawl using a specific set of test user credentials from user credential database 610. In particular embodiments, each web application listed in web application database 608 may be scheduled for crawling by primary 602 on a periodic (e.g., hourly, daily, weekly, monthly, etc.) or other predetermined basis, or on any other suitable basis. In particular embodiments, web applications that have been identified to use less scrupulous ad network servers 50 may be crawled more frequently than other web applications. In particular embodiments, user credential database stores user credentials that do not refer to real users of social networking system 20; that is, these "test" or "fake" user credentials may be generated by programs known in the art. In particular embodiments, the test user credentials for a given test or fake user allow the scheduled crawler process 606 to login to a social networking system 20 login page and access web pages and resources offered by social networking system 20. In particular embodiments, the test user may even have a user profile hosted by social networking system 20 in order to appear as a real user of social networking system 20 to web application servers 40 or ad network servers 50. In one implementation, the actions of logging in and navigating to various pages, can be implemented as Javascript code segments that the crawler process 606 can execute. For example, a programmer may write a script that defines an action sequence as to how the crawler process 606 accesses and performs various operations on web pages, such as logging into an account, accessing various application pages, and the like. The script can be written in Javascript, which the crawler process 606 can consume and execute to perform the required actions.

In particular embodiments, using the test user credentials and web application URL specified in the query received from primary 602, the scheduled crawler process may first login to a login page of social networking system 20 at 704. In alternate embodiments, no login step may be required. By way of example, the test user may be preauthorized by social networking system 20 or automatically granted access via crawler process 606. In particular embodiments, the crawler process then attempts to access the specified web application by transmitting, at 706, a request for the web application's canvas page as, for example, described with reference to the flowcharts of FIGS. 4 and 5. In other implementations, the request can identify any arbitrary page, the URL of which has been passed to the crawler process 606. In particular embodiments, as the structured document—in the form of structural document code and content including embedded scripts, resources, or identifiers for such resources—is received and processed by crawler process 606, crawler process 606 generates, at 708, a model representation of the web application's canvas page. That is, crawler process 606 may generate the model representation at 708 concurrently with or after various portions of the structured document are received from social networking system 20, web application server 40, or ad network 50. In particular embodiments, the model representation is a DOM representation. Here it should be noted that, in some embodiments, there is no need to actually display the rendered DOM representation of the web application canvas page. However, although the web application canvas page may not be rendered in a visual GUI on an actual physical display, in particular implementations, the DOM representation of the web application canvas page can be rendered into a framebuffer (or other suitable memory location) such as, by way of example, the open-source X Virtual Frame Buffer (Xvfb), coupled with crawler 606, and hence, is still effectively rendered into memory. More particularly, in certain implementations, a framebuffer may be required for the DOM representation to be rendered into. In particular embodiments, a framebuffer is advantageous as a framebuffer enables crawler process 606 to take "snapshots" of the DOM representation that may then be permanently stored (and hence available for actual visual viewing at a later time). Additionally, in particular embodiments, the entire DOM tree, not necessarily just the DOM representation held in the framebuffer, may be stored (temporarily or permanently) by crawler 606.

In some implementations, the crawler process 606 may log external interactions (such as outgoing requests and responses) as a structured document is being loaded and the model representation of the page is being generated (710). In particular embodiments, as the structured document is being processed and the DOM representation is being generated, crawler process 606 tracks and logs (e.g., in any suitable database), at 710, one or more interactions including outgoing requests transmitted as a result of executing embedded calls, scripts, or code segments as well as, in some embodiments, incoming responses received from web application server 40, ad network 50, or other locations (e.g., in the case of redirects). In particular embodiments, to perform the tracking/logging, crawler process 606 can be constructed to take advantage of certain functions of an underlying browser application (such as GECKO) that handle network requests. For example, the functions that handle network requests may support certain services, on which another process or module may install hooks. When an event, such as an outgoing request or incoming response occurs, a call back function can be called in order for the crawler process 606 to log the event. In particular embodiments, the overlying programming layer is configured to track interactions, such as, by way of example, all network requests made and transmitted by crawler process 606, such as in response to crawler process 606 executing calls, scripts, or other executable code segments embedded within the base page or the web application content itself. In particular embodiments, the overlying programming layer may also monitor, track, or log incoming responses transmitted to or for the crawler process.

The crawler process 606, after a page has been loaded, may then initiate application of one or more rule sets that enumerate various features of the structured document, as discussed below. For example, initially loading in a first page, such as an application canvas page or any other page, may cause the crawler process to be redirected to one or more additional servers. Such redirections can be done in connection with Javascript or via HTTP redirection messages. In one implementation, an page enumeration script can be triggered to execute in response to an onload event indicate that a page has loaded. In one implementation, the page enumeration script or other process can check to see if there are any "meta refreshes" pending (which signals a in impending redirection), before initiating enumeration of the loaded page. In this manner, the crawler process 606 can log all external interactions initiated when the first URL was loaded and wait until a final landing page has been loaded (after a series of possible redirections) before analyzing the attributes of the page. In some implementations, the crawler process further includes an overlying programming layer over the GECKO (browsing) layer that enables crawler process 606 to inspect and script against the model (DOM) representation of the web application canvas page. In particular embodiments, this overlying programming layer may be written largely in C++ as part of the crawler process that embeds GECKO using XPCOM. Additionally, the overlying programming layer may incorporate a JavaScript layer and associated JavaScript rule set that compute or determine features of interest on the DOM, and more generally, can inspect everything the web application canvas is doing. In particular embodiments, the overlying programming layer (and particularly the JavaScript portion) is also configured to capture state; that is, the state of the DOM after it has been rendered or throughout the rendering process. By way of example, the overlying programming (JavaScript) layer of crawler process 606 may be configured to take snapshots (e.g., a DOM snapshot) that captures all the interactions occurring as a result of loading the web application canvas page. In particular embodiments, the interactions of interest may be observed with the C++ portion of the overlying programming layer while the state is captured using the JavaScript rule set described above. In particular embodiments, the overlying JavaScript programming layer includes some or all of the JavaScript programming layer functionality written and provided by MOZILLA under the open-source projected called SPIDERMONKEY.

The scripted rule sets that can be applied to enumerate various attributes of the page can vary considerably and can be customized depending on the goals for the analysis. For example, some tracking processes can be used to police for so-called phishing sites, while other tracking processes can be used to track compliance with (or otherwise monitor the activities of) third party application providers and their respective ad networks. As discussed above, one implementation allows for the scripted rules to be written in Javascript to take advantage of a Javascript engine, such as SPIDERMONKEY. The rule set for example can be configured, for example, to scan the DOM for all forms, irrespective of whether they are within frames. The rule set can enumerate some key features from within every form, format each form as a Python parseable dictionary, and return all these individual form enumerations as a python list. The following code segment is Javascript that illustrates a possible scripted rule set for identifying and enumerating the attributes of a form.

```
function recursive_password_field_check(e) {
  if (e ==null) {
    return false;
  }
  if (e.type != undefined) {
    if (e.type.toLowerCase( ) == "password") {
      return true;
    }
  }
  for (var index = 0; index < e.childNodes.length; index++) {
    var child = e.childNodes[index];
    var result = recursive_password_field_check(child);
    if (result) {
      return true;
    }
  }
  return false;
}
function recursive_submit_check(e) {
  if (e == null) {
    return false;
  }
  if (e.type != undefined) {
    if (e.type.toLowerCase( ) == 'submit') {
      if (e.value.toLowerCase( ) == 'login') {
        return true;
      }
      if (e.value.toLowerCase( ) == 'sign in') {
        return true;
      }
      if (e.value.toLowerCase( ) == 'submit') {
        return true;
      }
    }
  }
  for (var index = 0; index < e.childNodes.length; index++) {
    var child = e.childNodes[index];
    var result = recursive_submit_check(child);
    if (result) {
      return true;
```

```
      }
    }
    return false;
  }
}
function recursive_submit_enumerator(e) {
  if (e == null) {
    return "";
  }
  var report ="";
  if (e.type != undefined) {
    if (e.type.toLowerCase( ) == "submit") {
      report = "\"" + e.value +"\", ";
    }
  }
  for(var index = 0; index < e.childNodes.length; index++) {
    var child = e.childNodes[index];
    var result = recursive_submit_enumerator(child);
    report = report + result;
  }
  return report;
}
function feature_contains_password (f) {
    return recursive_password_field_check(f);
}
function feature_form_action_host(f) {
    var ioservice = Components.classes["@mozilla.org/network/io-
service;1"].getService(Components.interfaces.nsIIOService);
    var uri = ioservice.newURi(f.action, null, null);
    return uri.host;
}
function feature_form_action_scheme(f) {
    var ioservice = Components.classes["@mozilla.org/network/io-
service;1"getService(Components.interfaces.nsIIOService);
    var uri = ioservice.newURI(f.action, null, null);
    return uri.scheme;
}
function feature_form_action_href(f) {
    return f.action;
}
function does_document_contain_password_field(doc) {
    var inputlist = doc.getElementsByTagName("input");
    var count = 0;
    for (var index = 0; index < inputlist.length; index++) {
      var inp = inputlist[index];
      if (inp.type != undefined) {
        if (inp.type.toLowerCase( ) == "password") {
          count++;
        }
      }
    }
    return count;
}
function enumerate_all_forms_in_window(win, doc) {
    var formlist = doc.getElementsByTagName("form");
    var report = "";
    for (var index = 0; index < formlist.length; index++) {
      var f = formlist[index];
      var contains_password = feature_contains_password(f);
      var contains_submit =recursive_submit_check(f);
      var enumerate_submit = "[" + recursive_submit_enumerator(f) + "]";
      var action_host = feature_form_action_host(f);
      var action_href = feature_form_action_href(f);
      var action_scheme = feature_form_action_scheme(f);
      var doc_contains_password = does_document_contain_password_field(doc);
      var form_details = "{";
      if (contains_password) {
         form_details = form_details + "\"feature.contains_password\": True, ";
      } else {
         form_details = form_details + "\"feature.contains_password\": False, ";
      }
      if (contains_submit) {
         form_details = form_details + "\"feature.contains_submit\": True, ";
      } else {
         form_details = form_details + "\"feature.contains_submit\": False, ";
      }
      form_details = form_details + "\"feature.doc_password\":" + doc_contains_password +", ";
      form_details = form_details + "\"feature.form_action\": \"" + f.action + "\", ";
      form_details = form_details + "\"feature.window_location\": \"" + win.location.href + "\", ";
      form_details = form_details + "\"feature.enum_submit\": " +enumerate_submit + ", ";
```

```
        form_details = form_details + "\"feature.action_host\": \"" + action_host + "\", ";
        form_details = form_details + "\"feature.action_href\": \"" + action_href + "\", ";
        form_details = form_details +"\"feature.action_scheme\": \"" + action_scheme +" \", ";
        form_details = form_details +"}, ";
            report = report + form_details;
        }
        return report;
    }
    function enumerate_all_forms( ) {
        var report = "[";
        var enumerated_forms = enumerate_all_forms_in_window(window, document);
        if (enumerated_forms.length > 2) {
            report = report + enumerated_forms;
        }
        var framelist = document.getElementsByTagName("frame");
        for (var index = 0; index < framelist.length; index++) {
            var f = framelist[index];
            enumerated_forms = enumerate_all_forms_in_window(f.contentWindow, f.contentWindow.document);
            if (enumerated_forms.length > 2) {
                report = report + enumerated_forms;
            }
        }
        framelist = document.getElementsByTagName("iframe");
        for (var index = 0; index < framelist.length; index++) {
            var f = framelist[index];
            enumerated_forms = enumerate_all_forms_in_window(f.contentWindow, f.contentWindow.document);
            if (enumerated_forms.length > 2) {
                report = report + enumerated_forms;
            }
        }
        report = report + "";
        return report;
    }
    enumerate_all_forms( );
```

The following illustrates an example raw data output by the enumeration script illustrated above:

{"feature.contains_password": False, "feature.contains_submit": False, "feature.doc_password": 1, "feature.form_action": "file:///E|/s((  ))ftware/office%202003/FILES/SPM/2010/search.php?do=process", "feature.window_location": "http://justa.phishsite.biz/phish_bonus.html", "feature.enum_submit": ["Go",], "feature.action_host": " ", "feature.action_href": "file:///E|/s((  ))ftware/office%202003/FILES/SPM/2010/search.php?do=process", "feature.action_scheme": "file",},
{"feature.contains_password": False, "feature.contains_submit": False, "feature.doc_password": 1, "feature.form_action": "file:///E|/s((  ))ftware/office%202003/FILES/SPM/2010/index.php", "feature.window_location": "http://justa.phishsite.biz/phish_bonus.html", "feature.enum_submit": [ ], "feature.action_host": " ", "feature.action_href": "file:///E|/s((  ))ftware/office%202003/FILES/SPM/2010/index.php", "feature.action_scheme": "file",},
{"feature.contains_password": True, "feature.contains_submit": False, "feature.doc_password": 1, "feature.form_action": "http://justa.phishsite.biz/logs.php", "feature.window_location": "http://justa.phishsite.biz/phish_bonus.html", "feature.enum_submit": ["Play Now",], "feature.action_host": "justa.phishsite.biz", "feature.action_href": "http://justa.phishsite.biz/logs.php", "feature.action_scheme": "http",},
{"feature.contains_password": False, "feature.contains_submit": False, "feature.doc_password": 1, "feature.form_action": "file:///E|/s((  ))ftware/office%202003/FILES/SPM/2010/index.php", "feature.window_location": "http://justa.phishsite.biz/chips_bonus.html", "feature.enum_submit": [ ], "feature.action_host": " ", "feature.action_href": "file:///E|/s((  ))ftware/office%202003/FILES/SPM/2010/index.php", "feature.action_scheme": "file",},
]

The raw data output can be processed as set forth below to facilitate logging and querying of the data:

feature.form_action: file:///E|/s((  ))ftware/office%202003/FILES/SPM/2010/search.php?do=process feature.enum_submit: ['Go']
feature.action_scheme: file
feature.contains_submit: False
feature.window_location: http://justa.phishsite.biz/phish_bonus.html
feature.doc_password: 1
feature.action_href: file:///E|/s((  ))ftware/office%202003/FILES/SPM/2010/search.php?do=process
feature.action_host:
feature.contains_password: False
feature.form_action: file:///E|/s((  ))ftware/office%202003/FILES/SPM/2010/index.php
feature.enum_submit: [ ]
feature.action_scheme: file
feature.contains_submit: False
feature.window_location: /justa.phishsite.biz/phish_bonus.html
feature.doc_password: 1
feature.action_href: file:///E|/s((  ))ftware/office%202003/FILES/SPM/2010/index.php
feature.action_host:
feature.contains_password: False
feature.form_action: http://justa.phishsite.biz/logs.php
feature.enum_submit: ['Play Now']
feature.action_scheme: http
feature.contains_submit: False feature.window_location: http://justa.phishsite.biz/phish_bonus.html
feature.doc_password: 1
feature.action_href: http://justa.phishsite.biz/logs.php
feature.action_host: justa.phishsite.biz
feature.contains_password: True
feature.form_action: file:///E|/s(( ))ftware/office%202003/FILES/SPM/2010/index.php
feature.enum_submit: [ ]
feature.action_scheme: file
feature.contains_submit: False
feature.window_location: http://justa.phishsite.biz/phish_bonus.html
feature.doc_password: 1
feature.action_href: file:///E|/s(( ))ftware/office%202003/FILES/SPM/2010/index.php
feature.action_host:
feature.contains_password: False Each block under processed output is the enumeration for a specific form embodied in an example page. The enumeration script can also be extended by adding more enumerated features in the dictionary corresponding to each form. And the fact that all this happens in JavaScript (in some implementations) precludes any necessity to recompile and redeploy the code. In addition, other scripts and rules can be implemented to apply certain transformative rules to various elements of the page. For example, a rule can be defined to locate the background image of the page and to leverage the functional libraries of the browser to generate a hash signature of the resulting image. This hash signature can be compared to hash signatures of previously crawled pages or pages crawled in the future to identify trends and possible commonalities across pages and starting URLs.

In particular embodiments, crawler 606 generates, at 712, a behavior model of the web application based on all or a filtered set of the logged interactions, and the enumerated features of the page. In particular embodiments, the behavior model specifies the URL of the web application, the URLs or Domain names of various resources for which requests were sent (including requests for ads sent to ad networks), the URLs or Domain names associated with various resources received from third party servers (including ads from ad networks), all or a portion of the HTML for the web application URL, all or a portion of the raw text of the web application (such as the raw and processed output described above), among other desired information. In particular, the behavior model provides a map of the outgoing requests, including requests made for ads to ad networks 50 by the web application, as a result of crawler 606 executing embedded calls within the web application content. In this way, all of the domains where requests are sent from the web application for the particular test user over a number of scheduled crawls (or even across test users, although in particular embodiments, the same test user is used in crawling a particular web application every time the web application is crawled in order to take advantage of and preserve previously downloaded cookies) may be used to provide insight into what particular ad networks an particular web application is using. In one implementation, a separate process, such as a process hosted on a primary computing system, may itself apply a rule set to the generated behavior model to determine whether the network application meets one or more requirements or is otherwise suitable. In addition, various features of the page are also logged for further analysis and tracking More particularly, in some embodiments, the logged data for a given web application may be transferred to Hadoop or other distributed computing platform for subsequent processing including filtering the data to ascertain which of the logged requests or associated URLs or Domain names correspond to ad networks and generating a second list or log of the ad networks. In particular embodiments, this second log may then be queried against a list of known rogue, scrupulous, banned, or otherwise in-violation ad networks. Furthermore, in some embodiments, crawler 606 may also capture, in the behavior model, various parameters sent to various domains, especially ad network domains, to determine if the web application or ad network providing the ad requested by the web application is passing any data received from social networking system 20 about the test user to other parties. Still further, the enumerated attributes of a landing page, for example, can be compared against one or more profiles to possibly identify a phishing site or some other unauthorized or undesirable application.

Still other enabled embodiments may include the ability to record, log, or index how a web application appears or functions at particular point in time to track changes over a determined window of time. Other embodiments may include automatically mapping out the flow paths of a given web application, including recording, logging, or indexing how an application's canvas page appears (and what its functionality is) at various points in a possible user flow. Still other embodiments may relate to a "socially-enabled" search index that includes elements of how one or more applications interact with or appear to logged-in users. Still other embodiments may include mapping or tracking variations in application functionality that depend on who the logged-in user is, or various categories of demographics or other characteristics or attributes available from the user profiles. Yet other embodiments may include indexing, mapping, or tracking how an application's functionality varies over geographic location, browser type, or type of computing device, for example.

As described herein, any of the described processes or methods can be implemented as a series of computer-readable instructions, embodied or encoded on or within a tangible data storage medium, that when executed are operable to cause one or more processors to implement the operations described above. For smaller datasets, the operations described above can be executed on a single computing platform or node. For larger systems and resulting data sets, parallel computing platforms can be used such as, for example, using Hive to accomplish ad hoc querying, summarization and data analysis, as well as using as incorporating statistical modules by embedding mapper and reducer scripts, such as Python or Perl scripts that implement a statistical algorithm. Other development platforms that can leverage Hadoop or other Map-Reduce execution engines can be used as well. The Apache Software Foundation has developed a collection of programs called Hadoop, which includes: (a) a distributed file system; and (b) an application programming interface (API) and corresponding implementation of MapReduce.

FIG. 1 illustrates an example distributed computing system, consisting of one master server 22*a* and two slave servers 22*b*. In some embodiments, the distributed computing system comprises a high-availability cluster of commodity servers in which the slave servers are typically called nodes. Though only two nodes are shown in FIG. 1, the number of nodes might well exceed a hundred, or even a thousand or more, in some embodiments. Ordinarily, nodes in a high-availability cluster are redundant, so that if one node crashes while performing a particular application, the cluster software can restart the application on one or more other nodes.

Multiple nodes also facilitate the parallel processing of large databases. In some embodiments, a master server, such as 22a, receives a job from a client and then assigns tasks resulting from that job to slave servers or nodes, such as servers 22b, which do the actual work of executing the assigned tasks upon instruction from the master and which move data between tasks. In some embodiments, the client jobs will invoke Hadoop's MapReduce functionality, as discussed above.

Likewise, in some embodiments, a master server, such as server 22a, governs a distributed file system that supports parallel processing of large databases. In particular, the master server 22a manages the file system's namespace and block mapping to nodes, as well as client access to files, which are actually stored on slave servers or nodes, such as servers 22b. In turn, in some embodiments, the slave servers do the actual work of executing read and write requests from clients and perform block creation, deletion, and replication upon instruction from the master server.

While the foregoing processes and mechanisms can be implemented by a wide variety of physical systems and in a wide variety of network and computing environments, the server or computing systems described below provide example computing system architectures for didactic, rather than limiting, purposes.

Figure 8:
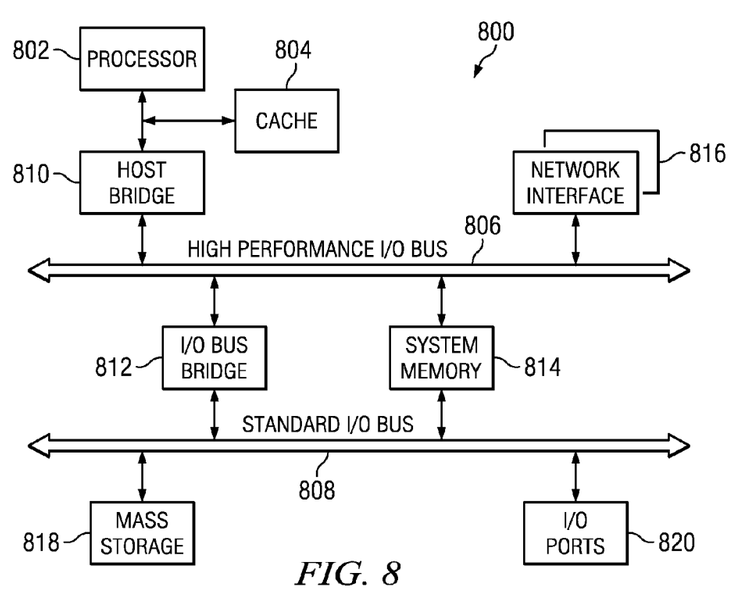
FIG. 8 illustrates an example computer system architecture.

FIG. 8 illustrates an example computing system architecture, which may be used to implement servers 22a or 22b, master 602, slaves 604, or each node of a distributed computing system. In one embodiment, hardware system 800 comprises a processor 802, a cache memory 804, and one or more executable modules and drivers, stored on a tangible computer readable medium, directed to the functions described herein. Additionally, hardware system 800 may include a high performance input/output (I/O) bus 806 and a standard I/O bus 908. A host bridge 810 may couple processor 802 to high performance I/O bus 806, whereas I/O bus bridge 812 couples the two buses 806 and 908 to each other. A system memory 814 and one or more network/communication interfaces 816 couple to bus 806. Hardware system 800 may further include video memory (not shown) and a display device coupled to the video memory. Mass storage 818, and I/O ports 820 couple to bus 908. Hardware system 800 may optionally include a keyboard and pointing device, and a display device (not shown) coupled to bus 908. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 800 are described in greater detail below. In particular, network interface 816 provides communication between hardware system 800 and any of a wide range of networks, such as an Ethernet (e.g., IEEE 802.3) network, a backplane, etc. Mass storage 818 provides permanent storage for the data and programming instructions to perform the above-described functions implemented in the servers 22a, 22b, whereas system memory 814 (e.g., DRAM) provides temporary storage for the data and programming instructions when executed by processor 802. I/O ports 820 are one or more serial and/or parallel communication ports that provide communication between additional peripheral devices, which may be coupled to hardware system 800.

Hardware system 800 may include a variety of system architectures; and various components of hardware system 800 may be rearranged. For example, cache 804 may be on-chip with processor 802. Alternatively, cache 804 and processor 802 may be packed together as a "processor module," with processor 802 being referred to as the "processor core." Furthermore, certain embodiments of the present invention may not require nor include all of the above components. For example, the peripheral devices shown coupled to standard I/O bus 908 may couple to high performance I/O bus 806. In addition, in some embodiments, only a single bus may exist, with the components of hardware system 800 being coupled to the single bus. Furthermore, hardware system 800 may include additional components, such as additional processors, storage devices, or memories.

In one implementation, the operations of the embodiments described herein are implemented as a series of executable modules run by hardware system 800, individually or collectively in a distributed computing environment. In a particular embodiment, a set of software modules and/or drivers implements a network communications protocol stack, parallel computing functions, browsing and other computing functions, optimization processes, and the like. The foregoing functional modules may be realized by hardware, executable modules stored on a computer readable medium, or a combination of both. For example, the functional modules may comprise a plurality or series of instructions to be executed by a processor in a hardware system, such as processor 802. Initially, the series of instructions may be stored on a storage device, such as mass storage 818. However, the series of instructions can be tangibly stored on any suitable storage medium, such as a diskette, CD-ROM, ROM, EEPROM, etc. Furthermore, the series of instructions need not be stored locally, and could be received from a remote storage device, such as a server on a network, via network/communications interface 816. The instructions are copied from the storage device, such as mass storage 818, into memory 814 and then accessed and executed by processor 802.

An operating system manages and controls the operation of hardware system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other implementations are possible. For example, the functions described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. By way of example, while embodiments of the present disclosure have been described as operating in connection with a social networking website, various embodiments of the present invention can be used in connection with any communications facility that supports web applications. Furthermore, in some embodiments the term "web service" and "web site" may be used interchangeably and additionally may refer to a custom or generalized API on a device, such as a mobile device (e.g., cellular phone, smart phone, personal GPS, personal digital assistance, personal gaming device, etc.), that makes API calls directly to a server.

The invention claimed is:

1. A method comprising:
accessing, by a web crawler executing on one or more computing systems associated with a social-networking system, a structured document of a network application, the structured document comprising structural information and content comprising one or more embedded scripts and one or more resources or identifiers for the resources;
executing, by the web crawler executing on the one or more computing systems, at least some of the content of the structured document;
processing, by the computing systems, the structured document to generate a model representation of the structured document;
tracking, by the computing systems, one or more interactions resulting from the web crawler's execution of at least some of the content, the interactions comprising one or more outgoing requests sent by one or more of the computing systems or incoming responses received by one or more of the computing systems from one or more third-party servers;
creating, by the computing systems, a behavior model of the network application based on one or more of the interactions resulting from the web crawler's execution of at least some of the content, the behavior model comprising a first log of outgoing HTTP requests generated by the network application when the content is executed;
creating, by the computing systems, a second log that comprises an identification of one or more network resources ascertained by filtering the first log;
comparing, by the computing systems, one or more of the network resources identified in the second log to a list comprising an identification of one or more rogue network resources;
by the computing systems, determining, based on the comparison, whether the network application meets one or more requirements of the social-networking system, wherein the one or more requirements comprise avoiding interaction with any of the rogue network resources.

2. The method of claim 1, further comprising enumerating one or more attributes of the structured document, wherein the behavior model comprises one or more of the enumerated attributes.

3. The method of claim 1, further comprising filtering, by the computing systems, the first log to ascertain the one or more network resources, which correspond to one or more advertisement developers or advertisement provider networks that the network application sent requests for advertisements to or that one or more incoming responses comprising advertisements were received from.

4. The method of claim 3, wherein the list of rogue network resources includes one or more of rogue ad networks, undesirable or unauthorized third-party systems, websites, or applications, or any combination thereof.

5. The method of claim 1, wherein:
the computing systems comprise a primary computing system and one or more secondary computing systems;
each of the secondary computing systems hosts the web crawler; and
the method further comprises receiving, by the web crawler, a request from the primary computer system to access the network application.

6. The method of claim 5, further comprising accessing, by the web crawler, one or more servers hosting a canvas web page.

7. The method of claim 6, further comprising logging into, by the web crawler, the servers using test user credentials.

8. The method of claim 5, wherein the web crawler is implemented, at least in part, with all or portions of a cross platform component model and a layout engine.

9. The method of claim 8, wherein:
the web crawler comprises an overlying programming layer overtop of the cross platform component model and layout engine layers;
the overlying programming layer comprises a JavaScript layer;
tracking the interactions occurring during the processing of the structured document comprises tracking the interactions by the overlying programming layer; and
the JavaScript layer of the overlying programming layer is configured to capture state in the DOM by capturing a snapshot of the state of the DOM after the structured document is rendered.

10. The method of claim 1, wherein the model representation is a Document Object Model (DOM) representation.

11. One or more computer-readable non-transitory storage media embodying software that is operable when executed to:
access, by a web crawler executing on one or more computing systems associated with a social-networking system, a structured document of a network application, the structured document comprising structural information and content comprising one or more embedded scripts and one or more resources or identifiers for the resources;
execute, by the web crawler executing on the one or more computing systems, at least some of the content of the structured document;
process, by the computing systems, the structured document to generate a model representation of the structured document;
track, by the computing systems, one or more interactions resulting from the web crawler's execution of at least some of the content, the interactions comprising one or more outgoing requests sent by one or more of the computing systems or incoming responses received by one or more of the computing systems from one or more third-party servers;

create, by the computing systems, a behavior model of the network application based on one or more of the interactions resulting from the web crawler's execution of at least some of the content, the behavior model comprising a first log of outgoing HTTP requests generated by the network application when the content is executed;

create, by the computing systems, a second log that comprises an identification of one or more network resources ascertained by filtering the first log;

compare, by the computing systems, one or more of the network resources identified in the second log to a list comprising an identification of one or more rogue network resources;

by the computing systems, determine, based on the comparison, whether the network application meets one or more requirements of the social-networking system, wherein the one or more requirements comprise avoiding interaction with any of the rogue network resources.

12. The media of claim 11 wherein the software is further operable when executed to enumerate one or more attributes of the structured document, wherein the behavioral model comprises one or more of the enumerated attributes.

13. The media of claim 11, wherein the software is further operable when executed to filter the first log to ascertain the one or more network resources, which correspond to one or more advertisement developers or advertisement provider networks that the network application sent requests for advertisements to or that one or more incoming responses comprising advertisements were received from.

14. The media of claim 13, wherein the list of rogue network resources includes one or more of rogue ad networks, undesirable or unauthorized third-party systems, websites, or applications, or any combination thereof.

15. The media of claim 11, wherein:
the software is further operable when executed to process a request to access the network application; and
accessing the web crawler is operable to access and render the network application.

16. The media of claim 15, wherein the web crawler is further operable to access one or more servers hosting a canvas web page.

17. The media of claim 16, wherein the web crawler is further operable to log into the servers using test user credentials.

18. The media of claim 15, wherein the web crawler is implemented, at least in part, with all or portions of a cross platform component model and a layout engine.

19. The media of claim 18, wherein:
the web crawler further comprises an overlying programming layer overtop of the component model and layout engine layers;
the overlying programming layer comprises a JavaScript layer;
to track the interactions occurring during the processing of the structured document, the software is operable when executed to track the interactions by the overlying programming layer; and
the JavaScript layer of the overlying programming layer is operable to capture state in the DOM by capturing a snapshot of the state of the DOM after the structured document is rendered.

20. The method of claim 1, wherein at least one network resource comprises a Domain name or a URL.

21. The media of claim 11, wherein at least one network resource comprises a Domain name or a URL.

* * * * *